W. M. POND.
HITCHING DEVICE.
APPLICATION FILED APR. 16, 1913.
1,094,014.
Patented Apr. 21, 1914.
2 SHEETS—SHEET 1.
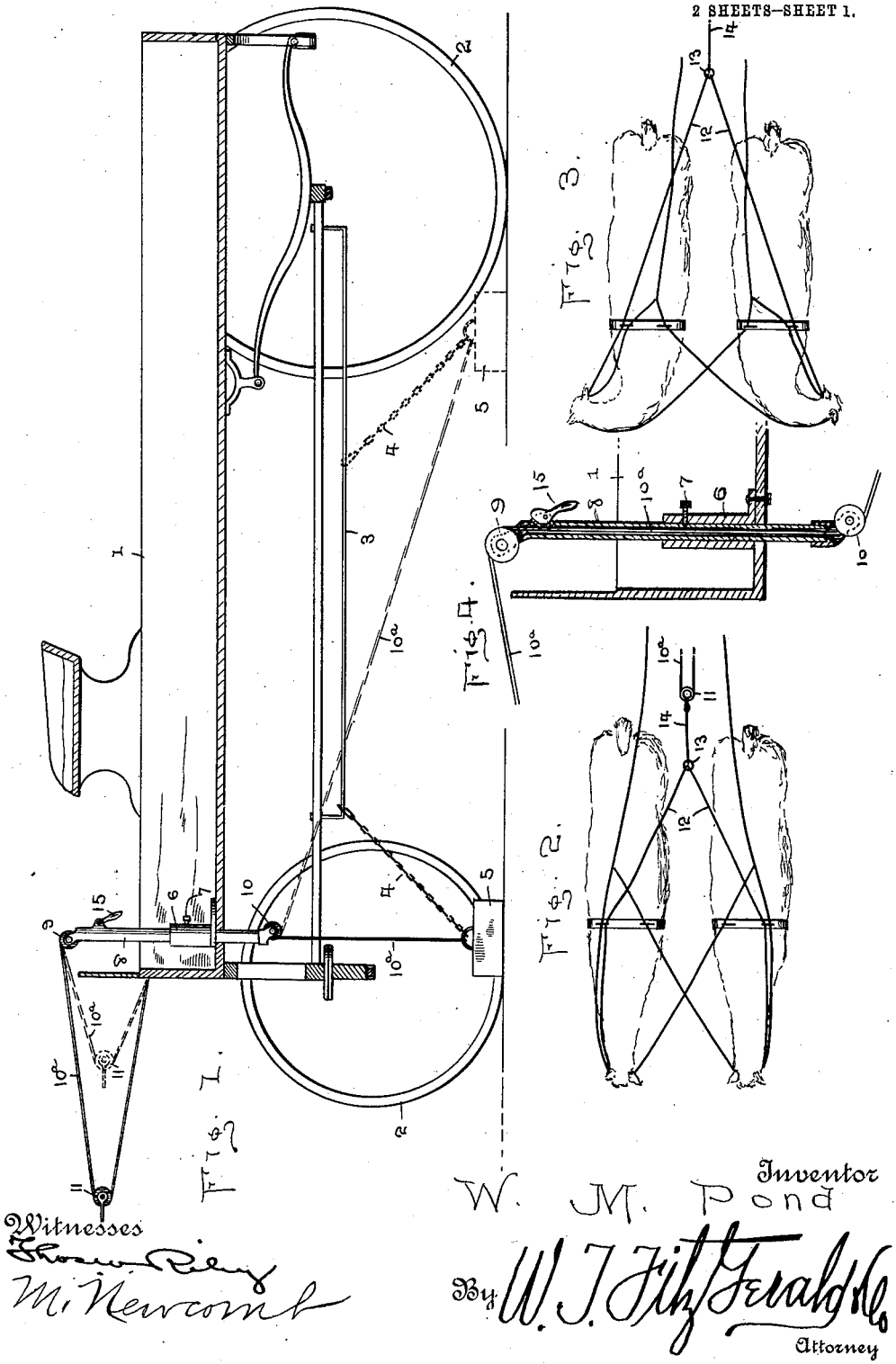

W. M. POND.
HITCHING DEVICE.
APPLICATION FILED APR. 16, 1913.
1,094,014.
Patented Apr. 21, 1914.
2 SHEETS—SHEET 2.
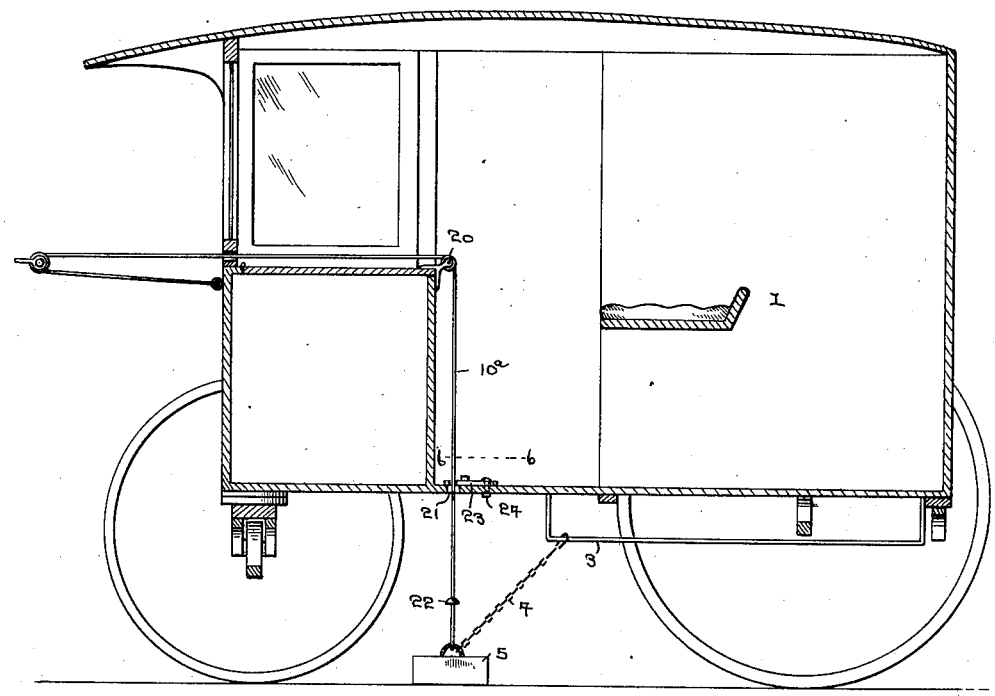
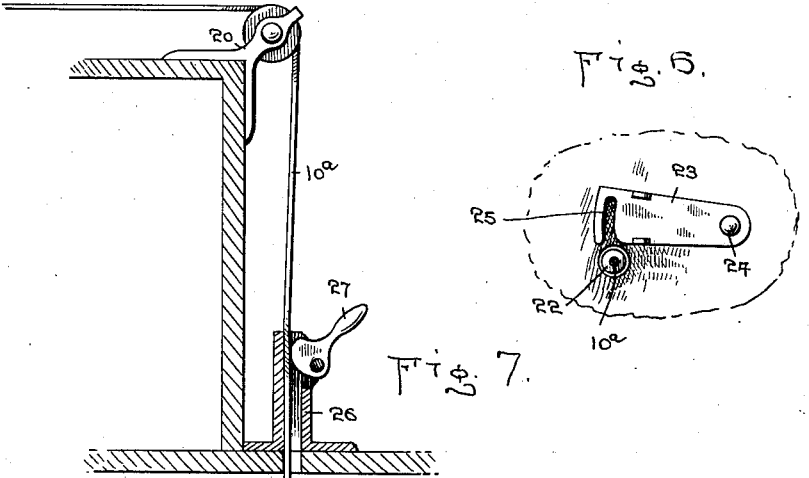
Witnesses
Inventor
W. M. Pond

UNITED STATES PATENT OFFICE.

WILLIS M. POND, OF CRETE, NEBRASKA.

HITCHING DEVICE.

1,094,014. Specification of Letters Patent. Patented Apr. 21, 1914.

Application filed April 16, 1913. Serial No. 761,419.

*To all whom it may concern:*

Be it known that I, WILLIS M. POND, a citizen of the United States, residing at Crete, in the county of Saline and State of Nebraska, have invented certain new and useful Improvements in Hitching Devices; and I do hereby declare the following to be a full, clear, and exact description of the invention, such as will enable others skilled in the art to which it appertains to make and use the same.

This invention relates to a hitching device which is particularly adapted for two horse vehicles and agricultural implements, although it may be slightly modified and adapted for one horse vehicles.

The invention has for its object the provision of a weight normally suspended from a vehicle above the ground and adapted to be lowered and rested upon the ground, and an elevated connection between the outside of the bridle bits of a pair of horses and the weight, whereby when the weight is lowered to the ground forward movement of the horses will be resisted by the weight and the connections between the outsides of the bridle-bits and the weight thus causing the heads of the animals to be turned outwardly.

A further object is to provide a hitching device having a weight connected with the under side of a vehicle and limited in its movement by the connection thereby preventing the weight from moving to a position under the wheels of the vehicle or the hoofs of the horses, but permitting the animals to back.

A further object is to interpose a pulley between the horses and the weight for increasing the resistance of the latter.

In the accompanying drawings, Figure 1 represents a sectional view through an ordinary wagon showing my improved hitching device as applied thereto. Fig. 2 represents a plan view of a portion of the connections between the bridles of a pair of horses and the weight. Fig. 3 represents a view similar to Fig. 2 showing the connections between the horses and the weight after the horses have moved a distance forwardly. Fig. 4 represents a sectional view through the guide and supporting means for the weight. Fig. 5 represents a sectional view through a vehicle showing the application thereto of a modified form of my invention. Fig. 6 represents a sectional view on the line 6—6 of Fig. 5, and, Fig. 7 represents a further modification of the support for the weight.

Referring to the drawings in detail, 1 indicates the body of a vehicle and 2 the wheels thereof. A rod 3 is secured to the under side of the body 1 and extends longitudinally of the latter, and is provided with a chain 4 which is slidable longitudinally thereon. A weight 5 is secured to the lower end of the chain 4 and may be formed of any suitable material and shape. The forward portion of the floor of the body portion 1 is apertured and has secured thereover a bracket 6 having a set screw 7 for securing in adjusted position the tubular guide 8 which extends through said bracket and the aperture of the floor of said body portion. The upper and lower ends of the guide 8 are provided with pulleys 9 and 10 respectively, and the lower pulley 10 may be rotatably secured to the guide 8. A cord or strap $10^a$ is connected at its lower end to the weight 5 and extends upwardly through the guide 8 and over the pulleys 9 and 10 at the opposite ends of the latter. A free pulley 11 is disposed over the upper portion of the cord or strap $10^a$, and the upper extremity of the latter is rigidly fixed to the forward portion of the body 1. A strap 12 is connected to the outside of the bridle bit of each horse (Figs. 2 and 3). The straps 12 are passed through the hame rings and turret in the back pads and are connected together by a ring 13 and to the frame of the pulley 11 by a connection 14.

When not in use the weight 5 is elevated from the ground by the strap $10^a$ and supported in this position by a cam 15 which engages the strap $10^a$ against the wall of the guide 8 and prevents the downward movement thereof. When the vehicle is at rest, however, and it is desired to hitch or restrain the draft animals harnessed thereto, the strap $10^a$ is released thus lowering the weight 5 upon the ground. If the animals move forwardly while the weight 5 is resting upon the ground it will be seen that the pulley 11 will be drawn inwardly by the movement of the strap $10^a$, and the straps 12 connected with the outsides of the bridle bits of the animals will also be drawn inwardly with the pulley 11 thus turning the heads of the horses outwardly and in opposite directions by the resistance of the weight 5 to their forward movement.

In dotted lines in Fig. 1, is shown the position of the weight 5 after the vehicle has been drawn forwardly thereover, and in Fig. 3, is shown the position of the heads of the animals after they have moved forwardly from the weight 5. The weight 5 is guided and limited in its movement beneath the vehicle by the chain 4 and slidably engaged over the rod 3.

In the modification of my invention disclosed in Figs. 5 and 6, a pulley 20 is fixed in a suitable bracket to a portion of the vehicle 1, and the strap 10ª extends thereover and through the opening 21 in the floor of the vehicle 1, and has attached to its lower end the weight 5. A suitable abutment or knot 22 is provided on the cord or strap 10ª adjacent the weight 5 and is adapted to be engaged over the latch 23 when the latter is moved upon its pivot point 24 to embrace the cord or strap 10ª within the slot 25 for supporting the weight in raised position.

In the modification disclosed in Fig. 7, the same pulley member 20 shown in Fig. 6 is employed, and for guiding and supporting the rope and weight in raised position I employ a sleeve member 26 carrying a cam 27.

What I claim is:—

1. The combination with a vehicle, of a rod secured thereunder, a weight, a flexible connection between said weight and said rod movable longitudinally of the latter, a guide secured in said vehicle, a connection secured at one end to the weight, extending through said guide and adapted to be secured at the opposite end to a bridle bit or bits, and means for securing said connection in said guide.

2. The combination with a vehicle, a bracket secured thereto, a guide vertically adjustable in said bracket, a weight movably attached to said vehicle, and a connection secured at one end to said weight, extending through said guide and adapted to be secured at the opposite end to a bridle bit or bits.

In testimony whereof I have signed my name to this specification in the presence of two subscribing witnesses.

WILLIS M. POND.

Witnesses:
J. HARTMON,
JOHN TULLY.

---

Copies of this patent may be obtained for five cents each, by addressing the "Commissioner of Patents, Washington, D. C."